United States Patent [19]
Brillant et al.

[11] Patent Number: 5,704,396
[45] Date of Patent: *Jan. 6, 1998

[54] MODULATION ROTARY VALVE

[75] Inventors: Daniel Brillant, Greer; Scott Griffin, Spartanburg, both of S.C.

[73] Assignee: Westinghouse Air Brake Company, Wilmerding, Pa.

[*] Notice: The term of this patent shall not extend beyond the expiration date of Pat. No. 5,582,206.

[21] Appl. No.: 583,339

[22] Filed: Jan. 5, 1996

[51] Int. Cl.$^6$ .................................................. E03B 1/00
[52] U.S. Cl. ........................... 137/625.15; 137/625.46; 251/175
[58] Field of Search .................. 137/625.46, 625.13, 137/625.15, 625.11; 251/175, 176, 185; 91/443

[56] References Cited

U.S. PATENT DOCUMENTS

| | | | |
|---|---|---|---|
| 3,590,872 | 7/1971 | Baity | 251/175 |
| 3,687,163 | 8/1972 | Nickels | 137/625.11 |
| 3,776,276 | 12/1973 | Stiltner | 251/175 X |
| 4,095,616 | 6/1978 | Krieger | 137/596 X |
| 4,148,460 | 4/1979 | Kinsler | 251/185 |
| 4,632,148 | 12/1986 | Stark et al. | 251/175 X |
| 4,773,447 | 9/1988 | Imanaka et al. | 137/627.5 |
| 5,118,418 | 6/1992 | Roussel | 137/625.46 |
| 5,251,670 | 10/1993 | Bates | 137/625.46 |
| 5,316,042 | 5/1994 | Lim et al. | 137/625.15 |

*Primary Examiner*—Hoang Nguyen
*Attorney, Agent, or Firm*—James Ray & Associates

[57] ABSTRACT

A self wear compensating valve for controlling flow of a fluid employs seals for sealing between relatively moving parts. In one of the parts, an annular recess is formed. A conformable sealing member is placed in the recess, and a spring biased to expel the conformable sealing member and press it against a sealing surface on the other part is provided. An O-ring placed on the outside of the conformable sealing member prevents leakage of fluid through the recess outside of the conformable sealing member. As the conformable sealing member is worn away, after many cycles of the valve, the spring continues to press it against the sealing surface, while the O-ring continues to prevent leakage of fluid outside the conformable sealing member. A rotary valve suitable for railroad brake applications is provided, which controls flow of fluid from a supply to the brake cylinder, and provides for exhaust of fluid from the brake cylinder. The valve has a supply port, a delivery port and an exhaust. In one position, the supply port is connected to the delivery port through a passage in the rotor. In another position, the delivery port is connected to the exhaust port through a passage in the rotor. In a third position, the lap position, all the ports are blocked by the relative position of the rotor and the housing. Proportional control of fluid flow is provided by elongating the ports on the mating surfaces of the rotor and the housing in the direction of rotation.

20 Claims, 9 Drawing Sheets

5,704,396

MODULATION ROTARY VALVE

CROSS REFERENCE TO RELATED APPLICATIONS

The invention taught in this patent application is closely related to the invention taught in a copending application, ROTARY MAGNET VALVE, Having Ser. No. 08/513,255 filed Aug. 10, 1995, now U.S. Pat. No. 5,582,206 issued on Dec. 10, 1996. That invention is by one of the inventors of the present application, and is assigned to the same assignee. The teachings of that application are incorporated into the present application by reference thereto.

FIELD OF THE INVENTION

This invention pertains to valves for control of fluids, and more particularly applies to air valves for controlling air to a brake cylinder in a railroad braking system.

BACKGROUND OF THE INVENTION

Valves for control of compressed air to brake cylinders in railroad braking systems generally have three basic positions:

(1) A position in which air is admitted from a supply of compressed air to the brake cylinder, this compressed air serving to apply the brakes.
(2) A position in which air is exhausted from the brake cylinder, which causes the brakes to be released.
(3) A position, referred to as the lap position, in which air is neither supplied to, nor exhausted from the brake cylinder. This position is used to maintain the brake application forces approximately constant.

In the past, this function has been provided by a valve having a linear displacement spool. The spool is positioned inside a cylindrical housing and is moved axially to change from one valve position to another. An example of this is U.S. Pat. No. 4,773,447 entitled ELECTROMAGNETIC VALVE, invented by Asaji Imanaka and Mitsuhiro Ikeda.

Valves of this type have the disadvantage that very precise machining is required, particularly in the bores where sealing is provided. Some of these valves require dynamic O-rings, which are subject to rubbing each time the valve position is changed. Some of these valves employ diaphragms. These valves require precise guiding, and various parts are needed for clamping the diaphragms.

Valves of the linear displacement type also have a large number of parts which must be assembled, and which must be disassembled for overhaul.

SUMMARY OF INVENTION

According to a first aspect, this invention provides a valve for controlling flow of air or other fluid from a supply to a destination. A first and a second member are required, each having an internal space for containing the fluid. Fluid from the supply is admitted to the internal space in the first member, and the internal space in the second member is connected to the destination. Each member has a surface for sealing with a port in it communicating with its internal space. The sealing surfaces are adjacent each other, and the two members move relative to each other with a shearing motion. At least one of the ports has a dimension parallel to the direction of the relative shearing motion which is greater than the dimension perpendicular to the direction of the relative shearing motion. A seal is provided on one of the members. The seal has an annular recess surrounding the port in the surface. A conformable sealing member having an annular form is placed in the annular recess. A spring is placed underneath it to press it against the surface of the other member. An O-ring is placed between the outer diameter of the conformable sealing member and the inside of the annular recess. This prevents leakage outside of the conformable sealing member. It also permits pressure of the fluid to be exerted on the conformable sealing member, so the pressure available for sealing increases with the pressure of the fluid. The force due to the fluid pressure is added to the force due to the spring. It should be noted that the O-ring is subjected to very little wear, because relative motion does not occur with every cycle of the valve. The conformable sealing member moves relative to the O-ring only as the conformable sealing member is worn away.

In an additional aspect, this invention provides a valve for controlling flow of a fluid from a supply to a volume wherein pressure is to be controlled, and for exhausting fluid from the volume to an exhaust port. A housing (which may have a plurality of components, such as a main body and a cover) has three ports: a supply port, a delivery port, and an exhaust port. A rotor is placed inside the housing, and means are provided for controlling its angular position. In a first position, a flowpath is provided through the rotor to join the supply port and the delivery port. In a second angular position, a flowpath is provided through the rotor to join the delivery port to the exhaust port. The rotor may also be positioned in a third angular position, which is a lap position in which no flowpaths are provided between ports. Seals between rotor and housing are provided to prevent loss of fluid from the supply port, loss from the delivery port, and loss to the exhaust port. At least one of the ports in the housing or at least one of the mating ports on the rotor has a dimension parallel to the direction of relative motion of the rotor and the housing greater than a dimension transverse to the direction of relative motion to allow proportional control of the opening between the rotor and the housing.

In a further aspect, this invention provides a valve for controlling flow of a fluid between a supply and a volume in which pressure is to be controlled, and between the volume and an exhaust port. In a first position, the valve provides connection between the supply and the volume where pressure is to be controlled. In a second position, the valve provides connection between the volume where pressure is to be controlled and exhaust. In a third position, which is a lap position, no flowpaths are established through the valve. The valve has a housing (which may have a plurality of components, such as a main body and a cover). A rotor is placed inside the housing. Inside the housing there are two axisymmetric surfaces, at two different axial positions. These may be planar surfaces perpendicular to the axis of the rotor. Seals are provided on the rotor pressing against these axisymmetric surfaces to prevent flow of fluid past either of the two axial positions. Fluid from the supply is introduced into the inside of the housing at an axial position between that of the two seals. A gap is provided between the housing and the rotor in the space between the two seals, so that fluid can flow around the rotor inside the housing. From this gap, the fluid flows into an internal space in the rotor. The rotor has an axisymmetric surface (which may be a planar surface perpendicular to its axis). A port is provided on this surface which communicates with the internal space inside the rotor. Two additional ports are provided in this surface, and these are connected to each other through a second passageway inside the rotor. The housing has an additional axisymmetric surface (which may be a planar surface perpendicular to the axis of the rotor). Two ports are provided on this surface, one is a delivery port connected to the volume in which pressure is to be controlled, and the other is for exhaust. Annular seals are provided surrounding each of the three ports on the axisymmetric surface of the rotor, and these seal against the axisymmetric surface of the housing. An annular seal is also provided surrounding the delivery port on the housing, and this seals against the axisymmetric surface on the rotor. Means are provided for positioning the rotor in three different positions. In one position, fluid from the first internal space in the rotor, which is the fluid being supplied, flows into the delivery port on the housing. In a second position, the supply space in the rotor is sealed off, and the delivery port is connected through the second passageway in the rotor to the exhaust port. In a third position, which is a lap position, each of the ports on these surfaces is sealed off, so that no flow to or from the delivery port occurs. At least one of the ports in the rotor or one of the ports in the housing has a greater dimension in a direction parallel to the direction of relative motion of rotor and housing than it has in a direction perpendicular to the direction of relative motion, to allow proportional control of the opening between the rotor and the housing.

OBJECTS OF THE INVENTION

It is, therefore, a primary object of the present invention to provide a valve having a flowpath which can be modulated from a fully closed position to a fully open position.

Another object of the present invention is to provide a railroad air brake valve which requires a minimum amount of precision machining.

Yet another object of the present invention is to provide a railroad airbrake valve which is lightweight.

Still another object is to provide a railroad air brake which does not require frequent overhaul.

Even another object is to eliminate the need for precise machining of bores, and replace it with the simpler machining of planar faces.

An additional object is to provide a railroad air brake valve which is highly reliable.

In addition to the various objects and advantages of the present invention described above, it should be noted that various other objects and advantages of the present invention will become more readily apparent to those persons who are skilled in the electric valve art from the detailed description of the invention, particularly, when such description is taken in conjunction with the attached drawing(s) and with the appended claims.

BRIEF DESCRIPTION OF INVENTION AND PRESENTLY-PREFERRED EMBODIMENT

Figure 1:
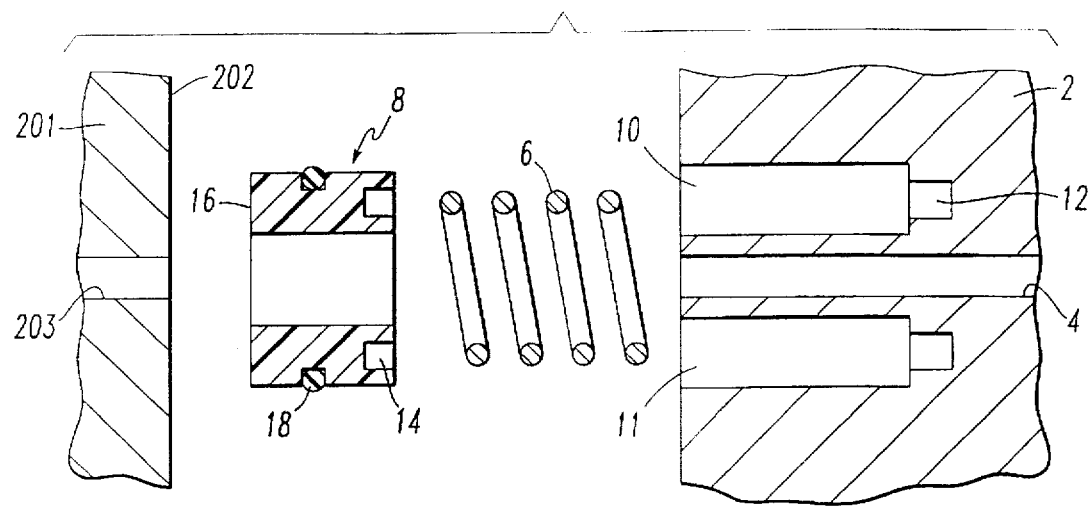
FIG. 1 shows a sealing means which is used in the various embodiments of this invention.

Prior to proceeding to a more detailed description of various embodiments of the present invention, for the sake of clarity and understanding of the invention, it should be noted that identical components having identical functions in each of the accompanying drawings have been identified with identical reference numerals throughout each of the several figures illustrated herein.

Reference is now made to the drawings, FIGS. 1 through 14. FIG. 1 shows a seal which is used in this invention. A first component 2 having a fluid passage 4 is sealed against a second component 201 having a port 203. The second component 201 has a surface 202, which is characterized as being smooth. Preferably, it may be made by machining and polishing. The two components 2 and 201 can be moved relative to each other by a shearing motion in the plane of the surface 202. The seal provides a passage between fluid passage 4 in first component 2 and fluid passage 203 in second component 201. When the two components 2 and 201 are relatively moved by a shearing motion, passage 203 no longer lines up with passage 4. The seal prevents leakage of fluid from passage 4.

An annular recess 10 is formed in first component 2, surrounding the passage 4. A spring 6 is placed in recess 10 and a conformable sealing member 8 which has an axisymmetric form, is placed over the spring 6. Preferably, sealing member 8 may be made of a soft, low friction material such as Teflon. It has a surface 16 for sealing against surface 202. An O-ring 18 is placed on the outside diameter of the sealing member 8 to seal with the surface 11 of the recess 10. (The O-ring 18 could also be positioned in the surface 11.) The O-ring 18 prevents leakage of fluid around the outside of the sealing member 8. Another annular recess 12 may be formed at the bottom of the recess 10, and an annular recess 14 may be formed on the conformable sealing member 8. These annular recesses 12 and 14 position the spring 6. The device is assembled by bringing second component 201 and first component 2 together so that sealing member 8 and spring 6 are pressed into recess 10. The spring 6 may be a coil spring, a spring washer, or other resilient means.

Means (not shown in FIG. 1) provide a relative shearing motion between the two components 2 and 201, so that in one position, passage 203 lines up with passage 4, while in another position, passage 4 is blocked off by surface 202, sealing means 8 and O-ring 18. Fluid passages 4 and 203 have a transverse dimension parallel to the direction of relative shearing motion greater than the transverse dimension perpendicular to the direction of relative shearing motion. Proportional control of the opening between member 2 and member 202 is thus possible, by control of the relative shear of members 2 and 202. Spring 6 keeps sealing member 8 pressed against surface 202 to prevent leakage.

It should be noted that in this design, fluid pressure in passage 4 is confined underneath member 8, and cooperates with the spring 6 to press the sealing member 8 against the surface 202. If the pressure of the fluid in passage 4 increases, the fluid force on sealing member 8 is increased. Hence, a high contact pressure between surface 16 of the sealing member 8 and surface 202 of second component 201 is provided when the fluid pressure is high. A low contact pressure is provided by spring 6 when the fluid pressure is low.

Figure 2:
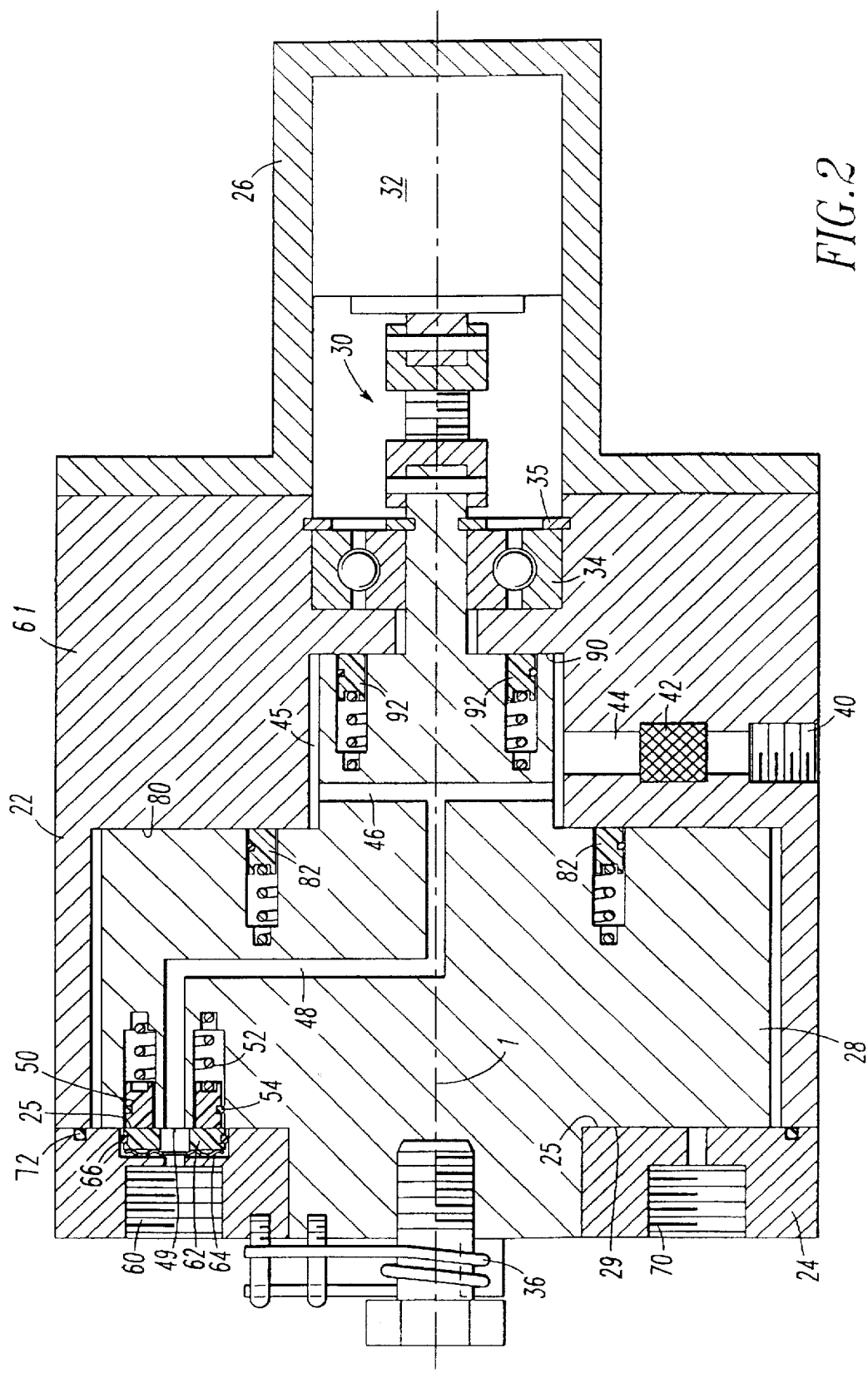
FIG. 2 shows a median section of one embodiment of this invention.

FIG. 2 shows an embodiment of this invention which is a valve assembly employing six seals of the type shown in FIG. 1. This valve has three positions. In one position, it admits fluid from supply port 40 and passes it to delivery port 60. In another position, the delivery port 60 is exhausted through exhaust port 70. The third position is a lap position in which the passages are blocked off.

This embodiment of the invention has a housing 22 and a housing cover 24. A rotor 28, having axis 1, is placed inside the housing. Rotor 28 is turned by rotary electromagnetic means 32 through an optional flexible coupling 30 and rotary bearing 34, which is kept in place by retaining ring 35. Control of its angular position is facilitated by a torsion spring 36. The housing 22 is closed off at its right end by a coil cover, 26.

Fluid from the fluid supply (not shown) is admitted to the housing through port 40. It passes through filter 42 and port 44 into gap 45 between housing 22 and rotor 28. A seal, generally shown as 92 is provided to the right of gap 45, pressing against machined face 90 on the inside of the housing 22. A seal, generally shown as 82 is provided to the left of gap 45, pressing against machined face 80 on the inside of the housing 22. Seals 82 and 92 are large-diameter versions of the seal shown in FIG. 1. Each of these passes entirely around the axis of the valve.

A transverse passageway 46 in the rotor passes fluid from gap 45 to passage 48 in the rotor. The transverse passage 46 also serves to equalize pressures on opposite sides of the rotor 28 in gap 45. Passage 48 terminates on the left face of the rotor at port 49.

In the relative angular position shown in FIG. 2, the supply passage 48 in the rotor 28 is lined up with the delivery passage 60.

A seal consisting of conformable sealing member 50, sealed on its outer diameter by O-ring 54, and pressed by spring 52, seals against smooth surface 25 on the housing cover 24. This seal prevents loss of fluid from passageway 48. Likewise, a seal consisting of conformable member 62 with O-ring 66 and pressed by spring 64 surrounds the delivery port 60 in the housing cover 24. This seal prevents loss of fluid from the delivery port when the valve is in the lap position in which port 60 is closed off by surface 29 on the rotor 28. An exhaust port 70 in housing cover 24 is provided.

Static O-ring 72 prevents loss of fluid between housing 22 and housing cover 24.

Figure 3:
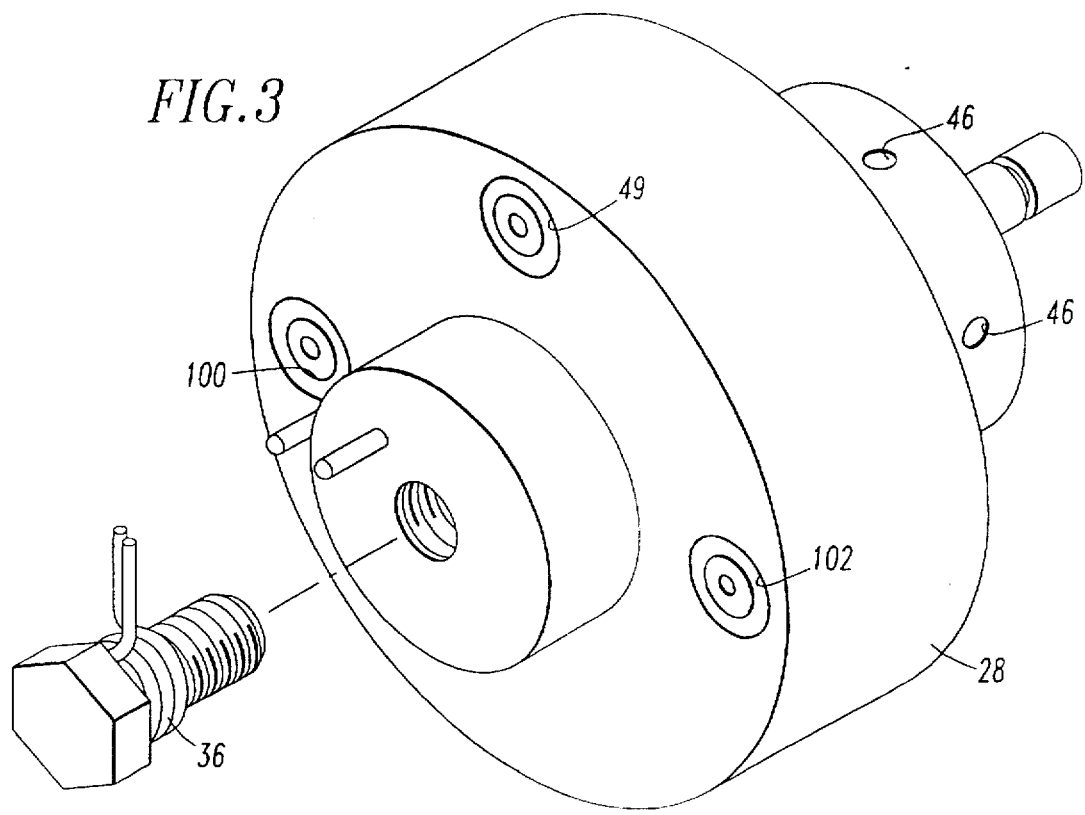
FIG. 3 shows a perspective view of a rotor used in the embodiment of FIG. 2.

FIG. 3 is a perspective of the rotor used in the embodiment shown in FIG. 2. Two transverse passages 46 are shown. The transverse passages 46 permit fluid to flow transversely through the rotor, and equalize pressures around the circumference of the rotor.

Supply port 49 shown in this figure, is also shown in FIG. 2. When this valve is in the supply position, as shown in FIG. 2, supply port 49 is lined up with delivery passage 60. Additionally, exhaust ports 100 and 102 are shown in the rotor. These are connected by an internal passageway in the rotor. When the valve is in the exhaust position, these ports are lined up with the delivery port 60 and exhaust port 70.

Torsion spring 36, which cooperates with rotary electromagnetic means 32 to establish angular position is shown in this figure.

Figure 4:
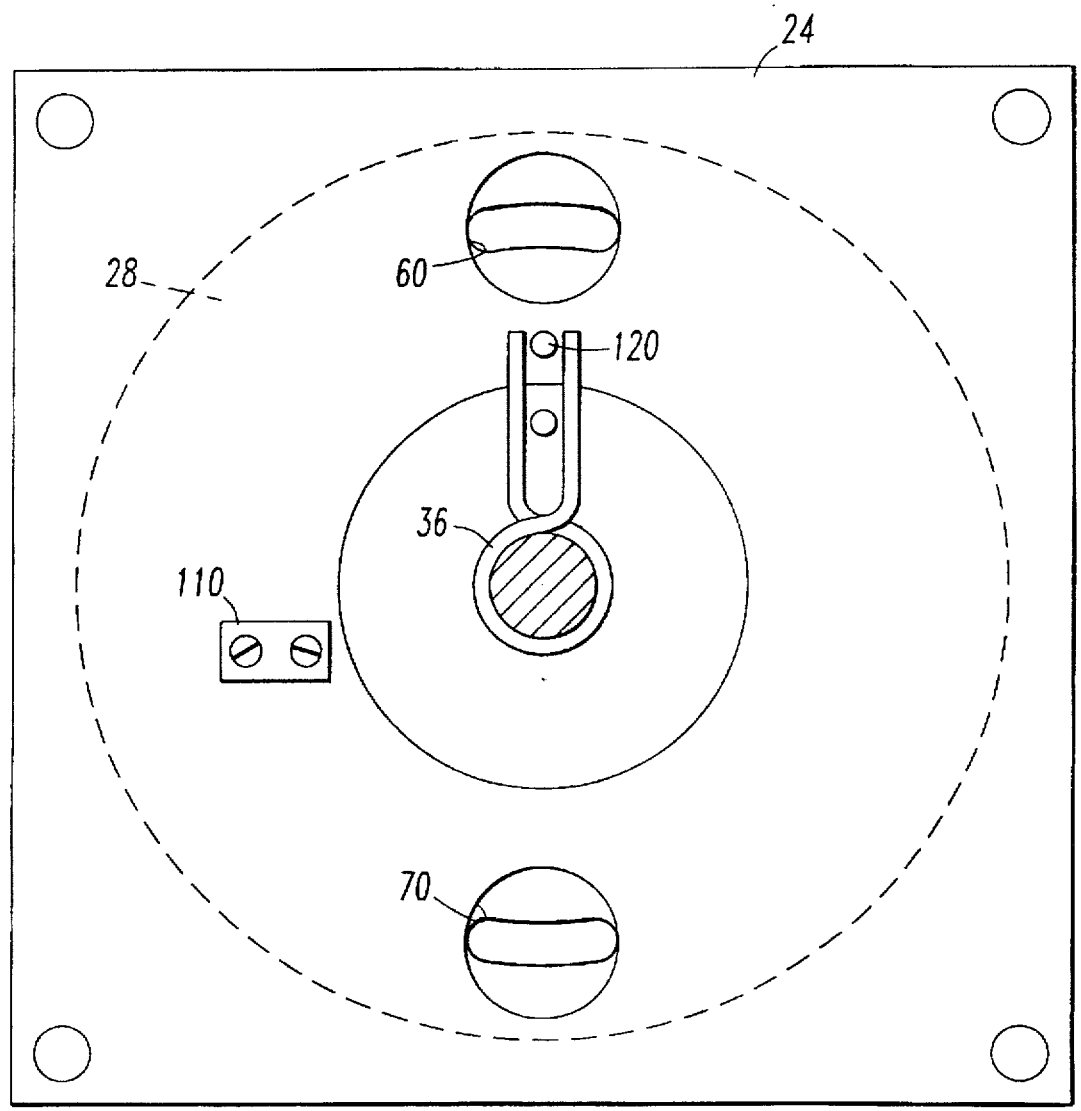
FIG. 4 shows an end view of the housing in the embodiment of FIG. 2.

FIG. 4 shows the housing cover, the view being taken from the left side in FIG. 2. The delivery port is denoted 60 and the exhaust port is denoted 70. Torsional spring 36 is shown, as are the rotary stops 110 and 120, which limit the angular motion.

This embodiment of the invention works as follows. When no current is supplied to the rotary electromagnetic means, it generates zero torque. The rotary spring 36 then positions the rotor in the delivery position, which is the position shown in FIG. 2. When a large current is supplied to the rotary electromagnetic means, the rotor moves until it is stopped by rotary stops 110 and 120. In this position, the delivery port 60 and exhaust port 70 in the cover communicate with ports 100 and 102 on the rotor. In this position, fluid is exhausted from the volume (not shown) which is supplied by the delivery port 60.

When a current of intermediate magnitude is supplied to the rotary electromagnetic means, the rotor is moved to a position in which the torque due to torsion spring 36 balances the torque from the electromagnetic means. In this position, none of the ports are lined up. This is the lap position.

The rotary electromagnetic means may be a DC motor, an AC-DC motor, or a rotary solenoid. The electromagnetic means are selected to demand very little power in the stalled condition.

In a variation of this embodiment, a step motor is used in place of the type of electromagnetic means suggested above. The step motor changes its angle in accordance with the number of pulses supplied to it. In this case, the torsional spring 36 would not be required.

Figure 5:
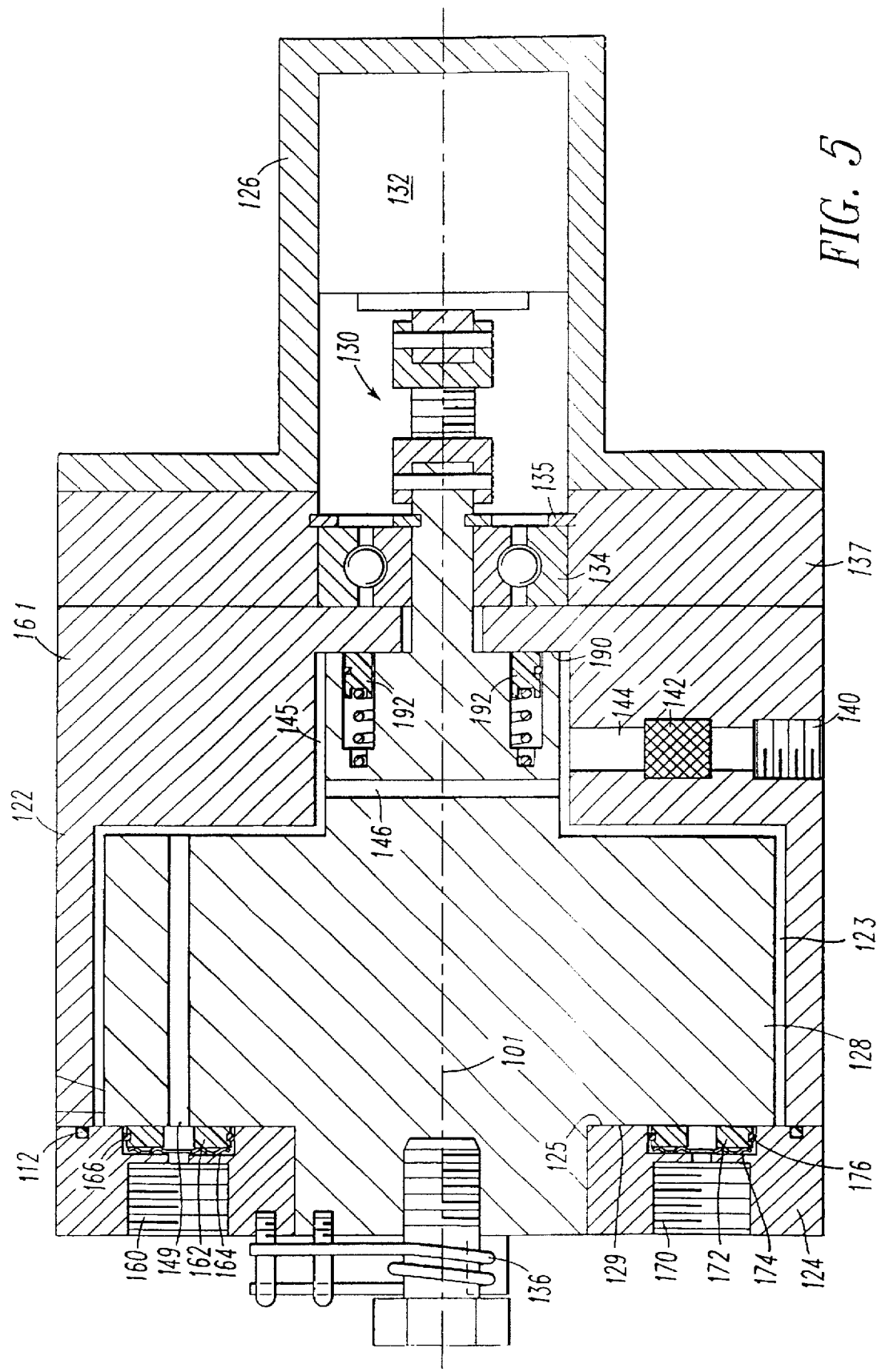
FIG. 5 shows a median section of another embodiment of this invention.

FIG. 5 shows an embodiment of this invention which is a valve assembly employing three seals of the type shown in FIG. 1. This valve has three positions. In one position, it admits fluid from supply port 140 and passes it to delivery port 160. In another position, the delivery port 160 is exhausted through exhaust port 170. The third position is a lap position in which the passages are blocked off.

This embodiment of the invention has a housing 122 and a housing cover 124. A rotor 128, having axis 101, is placed inside the housing. Clearance, with allowance for manufacturing tolerances, is provided by the gap 123 between the housing 122 and the rotor 128. Rotor 128 is turned by rotary electromagnetic means 132 through an optional flexible coupling 130 and rotary bearing 134, which is kept in place by retaining ring 135. Control of its angular position is facilitated by a torsion spring 136. The housing 122 is closed off at its right end by a bearing mount 137 and coil cover, 126.

Fluid from the fluid supply (not shown) is admitted to the housing through port 140. It passes through filter 142 and port 144 into gap 145 between housing 122 and rotor 128. A seal, generally shown as 192 is provided to the right of gap 145, pressing against machined face 190 on the inside of the housing 122. Seal 192 is a version of the seal shown in FIG. 1. This seal passes entirely around the axis of the valve, 101.

Transverse passage 146 serves to equalize pressures on opposite sides of the rotor 128 in gap 145.

In the relative angular position shown in FIG. 5, the axial supply passage 149 in the rotor 128 is lined up with the delivery port 160.

A seal consisting of conformable member 162 with O-ring 166 and pressed by spring 164 surrounds the delivery port 160 in the housing cover 124. This seals against the machined surface of the rotor, 129. This seal prevents flow of fluid from gap 123 to the delivery port 160.

An exhaust port 170 in housing cover 124 is also provided. This port has seal consisting of conformable sealing member 172 with O-ring 176 and spring 174. This seals against the machined surface of the rotor, 129. This seal prevents flow of fluid from gap 123 to the exhaust port.

Static O-ring 112 prevents loss of fluid between housing 122 and housing cover 124.

Figure 6:
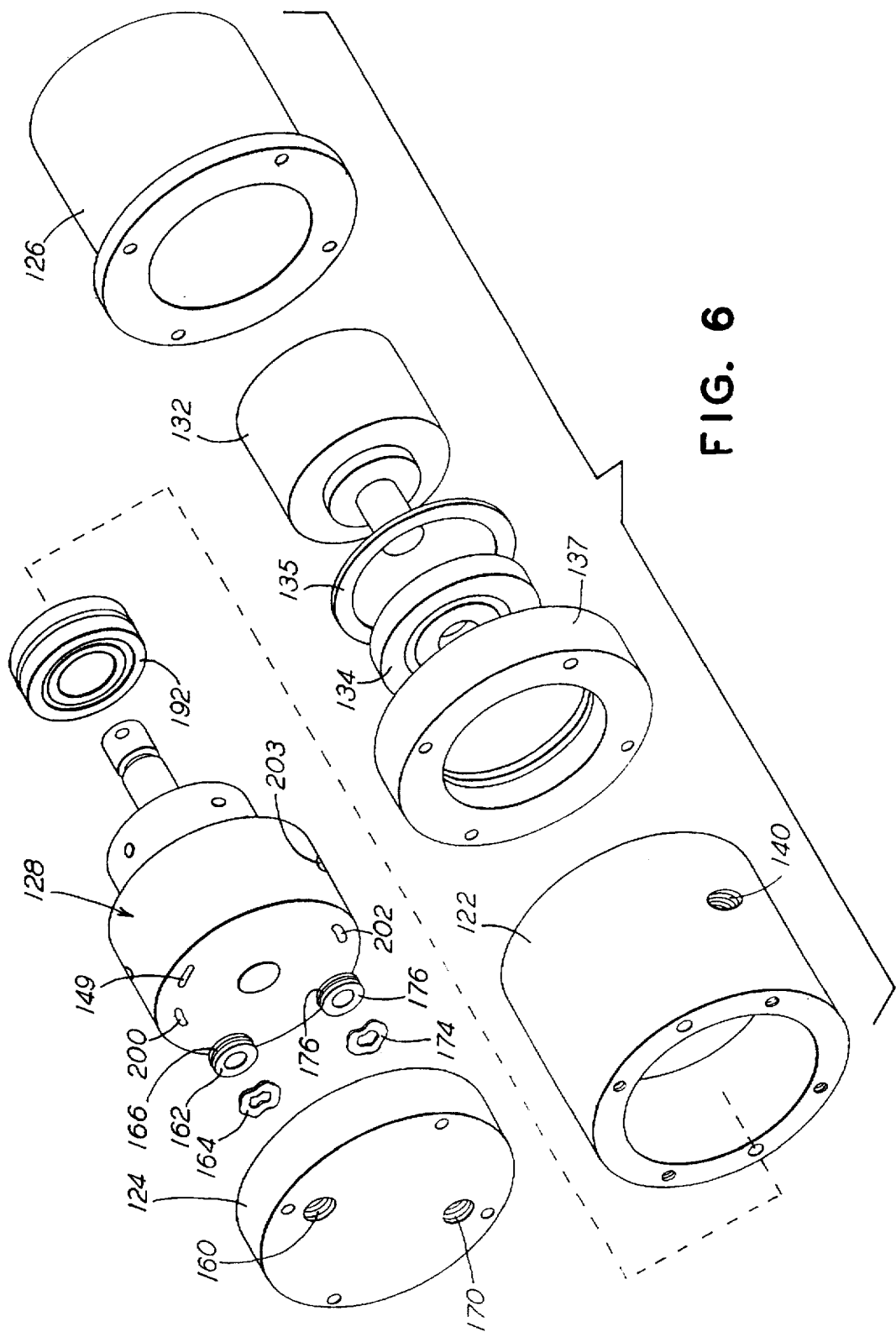
FIG. 6 shows an exploded view of the embodiment shown in FIG. 5.
Figure 7:
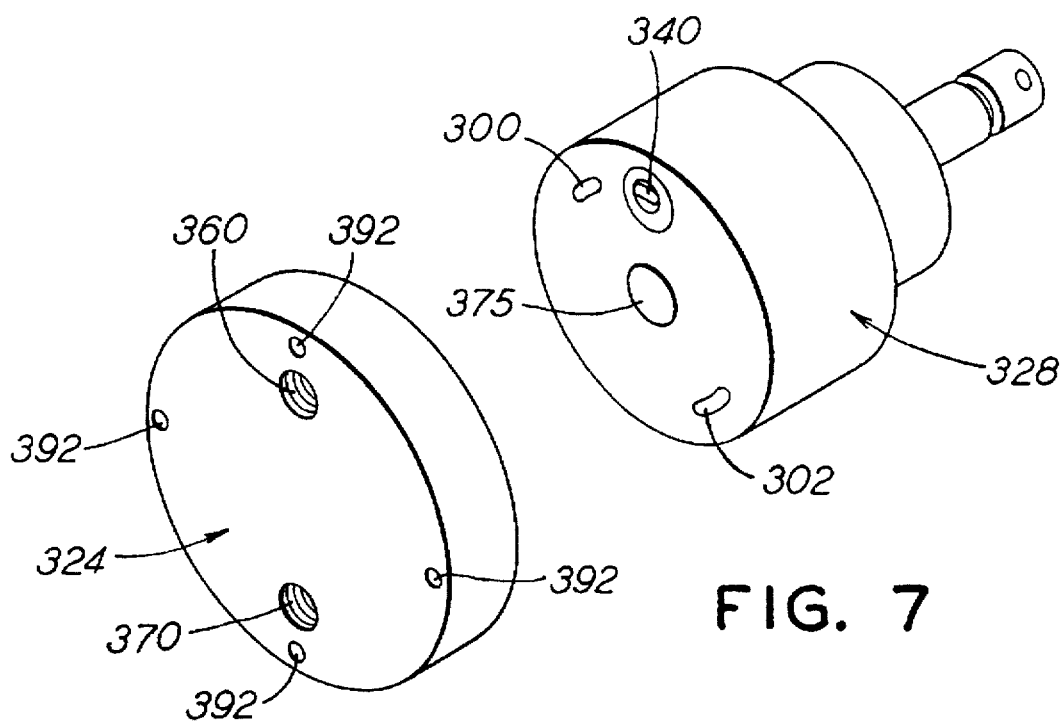
FIG. 7 shows a perspective view of an embodiment in which the rotor is supported by a shaft attached to the housing cover. This figure shows the supply port on the rotor lined up with the delivery port on the housing cover.
Figure 14:
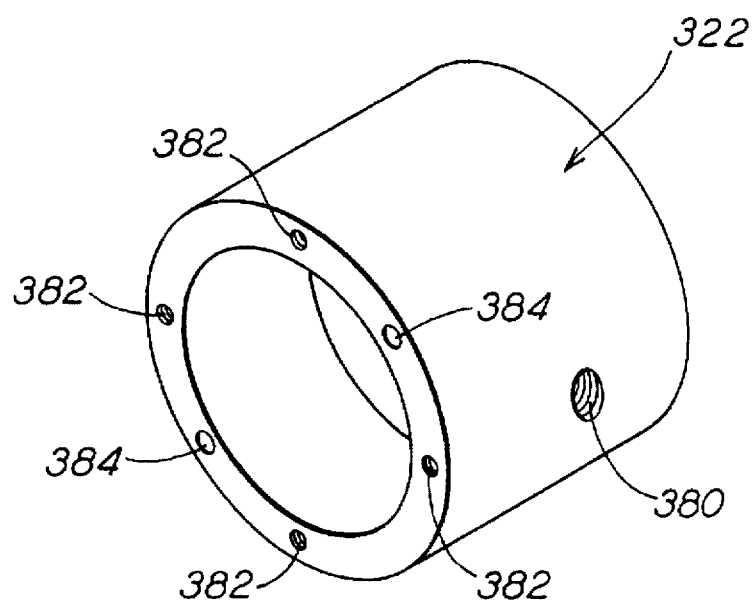
FIG. 14 shows a detail of the housing.
Figure 8:
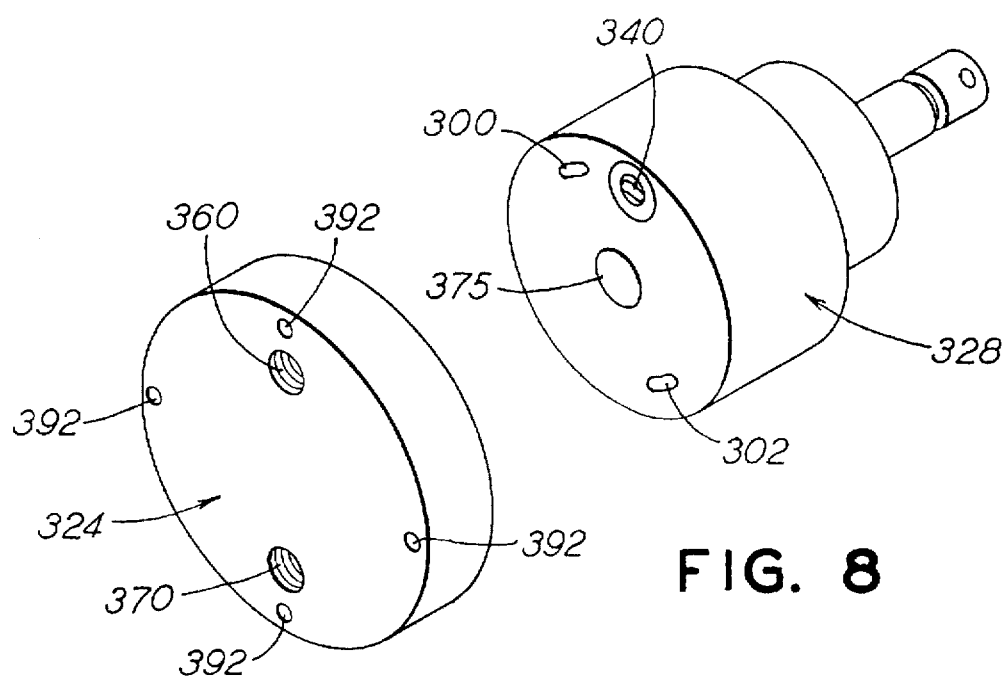
FIG. 8 shows the embodiment of FIG. 7 in which the flowpath from the rotor supply port to the delivery port is partially open.
Figure 9:
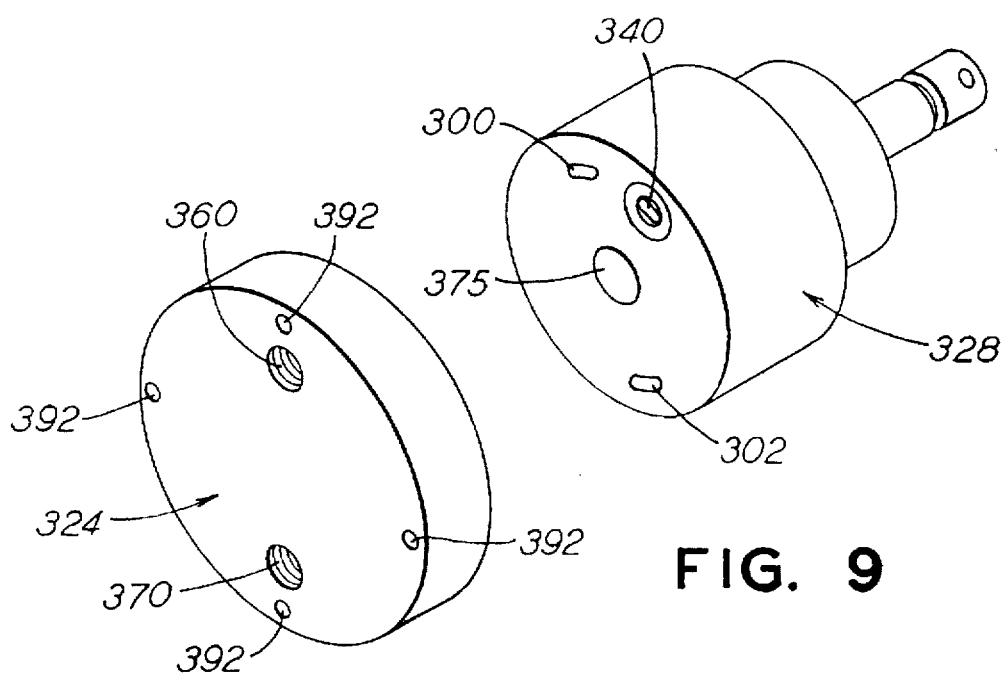
FIG. 9 shows the embodiment of FIG. 7 in which the delivery port is closed off to provide a lap position.
Figure 10:
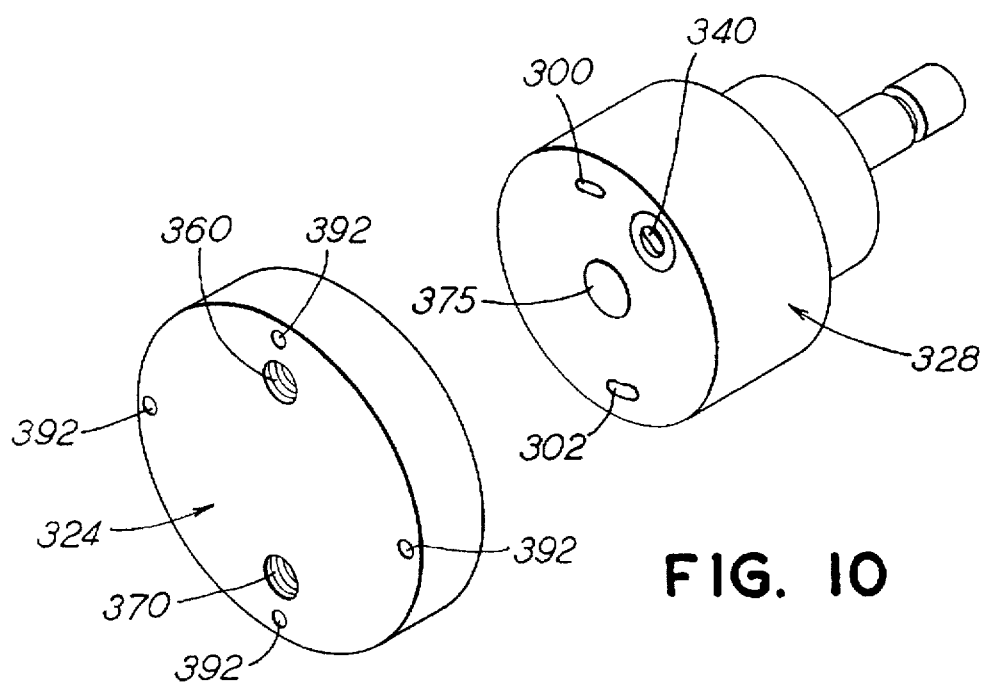
FIG. 10 shows the embodiment of FIG. 7 in which the path from the delivery port to the exhaust port is partially open to provide a modulated release of pressure in the delivery port.
Figure 11:
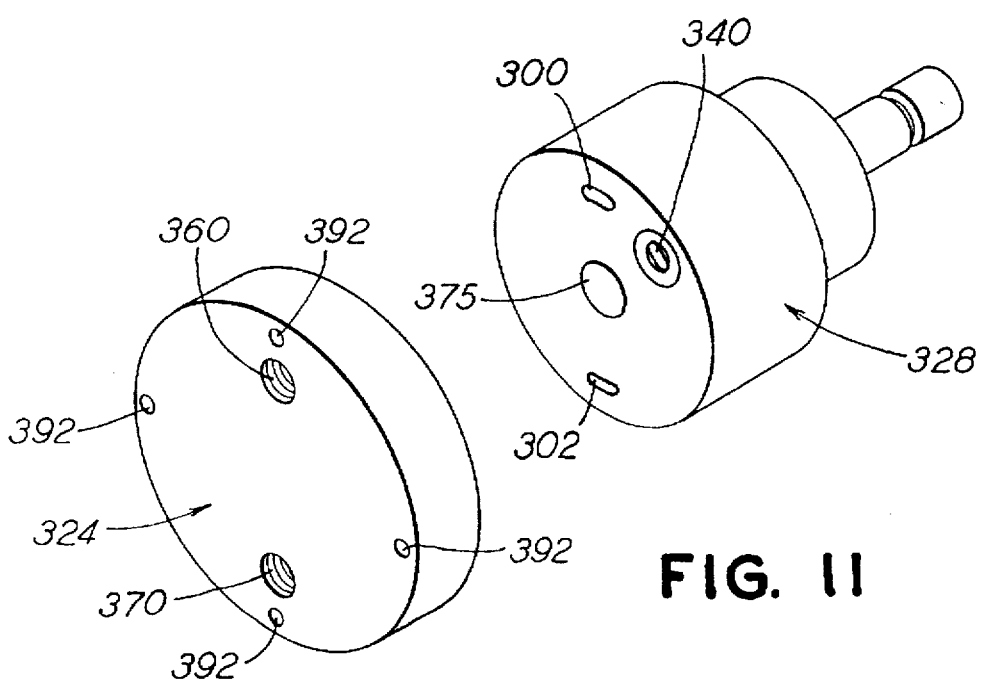
FIG. 11 shows the embodiment of FIG. 7 in which the path from the delivery port to the exhaust port is fully open to provide a full release of pressure in the delivery port.

FIG. 6 is an exploded perspective of the rotor used in the embodiment shown in FIG. 5. Housing 122 has supply port 140. Rotor 128 is disposed inside housing 122. A seal between rotor 128 and an inner surface of housing 122 is indicated generally as 192. This prevents flow to the right in the figure, in the space between the rotor and the housing. The end of passage 149 through the rotor is shown in this figure. The rotor is mounted by bearing 134 which is retained by retaining ring 135 and located in bearing mount, 137. The rotor is driven by rotary electromagnetic means, 132, which is in the coil cover, 126.

The housing cover 124 has delivery port 160. This port is sealed against the face of the rotor by conformable sealing member 162 which is sealed on its outside diameter by O-ring 166, and pressed against the rotor by spring 164.

The housing cover 124 also has exhaust port 170. This port is sealed against the face of the rotor by conformable sealing member 172 which is sealed on its outside diameter by O-ring 176 and pressed against the rotor by spring 174.

When this valve is in the supply position, as shown in FIG. 5, supply passage 149 is lined up with delivery port 160. Additionally, exhaust ports 200 and 202 are shown in the rotor. These are connected by an internal passageway in the rotor.

This passageway may be provided by drilling diametrically through the rotor, an end of this passageway being shown as 203. This passageway would be completed by drilling axially from port 200 and 203 to meet this passageway, and by plugging the ends of this passageway; one end of this passageway being shown at 203.

When the valve is in the exhaust position, port 200 is lined up with the delivery port 160, and port 202 is lined up with exhaust port 170. Since port 200 and 202 are joined by a passageway through the rotor, this causes the pressure in the delivery port 160 to be exhausted out the exhaust port 170.

This embodiment of the invention works as follows. When no current is supplied to the rotary electromagnetic means, it generates zero torque. The rotary spring 136 then positions the rotor in the delivery position, which is the position shown in FIG. 5. When a large current is supplied to the rotary electromagnetic means, the rotor moves until it is stopped by rotary stops (not shown). In this position, the delivery port 160 and exhaust port 170 in the cover communicate with ports 200 and 202 on the rotor. In this position, fluid is exhausted from the volume (not shown) which is supplied by the delivery port 160.

When a current of intermediate magnitude is supplied to the rotary electromagnetic means, the rotor is moved to a position in which the torque due to torsion spring 136 balances the torque from the electromagnetic means. In this position, none of the ports are lined up. This is the lap position.

The rotary electromagnetic means may be a DC motor, an AC-DC motor, or a rotary solenoid. The electromagnetic means are selected to demand very little power in the stalled condition.

In a variation of this embodiment, a step motor is used in place of the type of electromagnetic means suggested above. The step motor changes its angle in accordance with the number of pulses supplied to it. In this case, the torsional spring 136 would not be required.

FIGS. 7 through 14 show an embodiment of this invention in which the rotor is supported by a shaft on the cover. These figures show in detail the elongation of the delivery port 340 on the rotor 328, the first rotor exhaust port 300, the second rotor exhaust port 302, the supply port 360 on the housing cover and the exhaust port 370 on the housing cover. Housing 322 (FIG. 14) has inlet port 380 having an air filter element (not shown). The housing has threaded holes 382 for attachment of a cover 324. The housing has dowel pin holes 384 for dowel pins (not shown) for precise positioning of cover 324.

Figure 12:
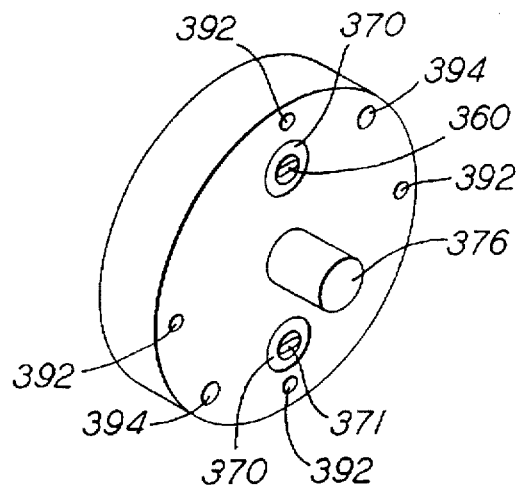
FIG. 12 shows a detail of the cover of the embodiment of FIG. 7.
Figure 13:
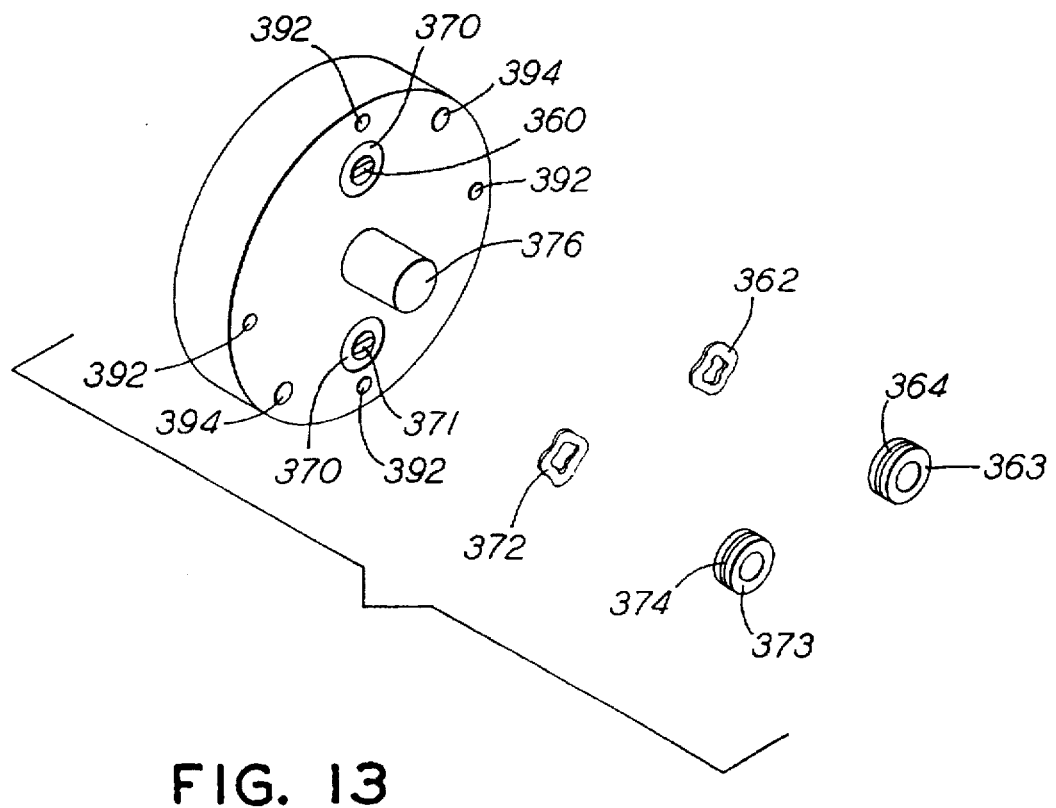
FIG. 13 shows a detail of the cover and ring seals of the embodiment of FIG. 7.

The housing cover 324 has a rotor support shaft 376 (FIGS 12 and 13). It has clearance holes 392 for bolts (not shown) for attachment to the threaded holes 382 on the housing. It also has dowel pin holes 394 to receive the dowel pins (not shown) for precise positioning in relation to dowel pin holes 384 in the housing.

The housing cover has a delivery port 360 surrounded by an annular space 361. A wave washer or other resilient means 362 is placed in the annular space 361, and an annular seal 363 is placed in space 361 on top of resilient means 362. An O-ring (not shown) is provided in a groove 364 in the annular seal 363. In another option, the O-ring groove would be machined in the O.D. surface of the annular space 361.

The housing cover has an exhaust port 370 surrounded by an annular space 371. A wave washer or other resilient means 372 is placed in the annular space 371, and an annular seal 373 is placed in space 371 on top of resilient means 372. An O-ring (not shown) is provided in a groove 374 in the annular seal 373. In another option, the O-ring groove would be machined in the O.D. surface of the annular space 371.

Rotor 328 is placed within housing 322. The rotor has a supply port 340, as well as a first exhaust port 300 and second exhaust port 302. These exhaust ports are connected by a passageway (not shown) in the rotor. The rotor has a support hole 375 which fits over the rotor support shaft 376 in the housing cover 324.

The embodiment of the invention shown in FIGS. 7 through 14 is the presently most preferred embodiment.

Now, discussing the invention more generally, in a first aspect, this invention provides a valve for controlling flow of air or other fluid from a supply to a destination. A first and a second component are required, each having an internal space for containing the fluid. Fluid from the supply is admitted to the internal space in the first component, and the internal space in the second component is connected to the destination. Each component has a surface for sealing with a port in it communicating with its internal space. The sealing surfaces are adjacent each other, and the two components move relative to each other with a shearing motion.

A seal is provided on one of the components. The seal has an annular recess surrounding the port in the surface. A conformable sealing member having an annular form is placed in the annular recess. A spring is placed underneath it to press it against the surface of the other component. The spring may be a coil spring, a spring washer, or any other spring which can exert an axial force on the annular conformable sealing member. An O-ring is placed between the outer diameter of the conformable sealing member and the inside of the annular recess. This prevents leakage outside of the conformable sealing member. It also permits pressure of the fluid to be exerted on the conformable sealing member, so the pressure available for sealing increases with the pressure of the fluid. The force due to the fluid pressure is added to the force due to the spring.

It should be noted that the O-ring is subjected to very little wear, because relative motion does not occur with every cycle of the valve. The conformable sealing member moves relative to the O-ring only as the conformable sealing member is worn away.

The relative shearing motion of this valve may be provided by a relative rotation of the two components. In that case, the sealing surface on the component not having the conformable sealing member is an axisymmetric surface. A simple example of such a surface is a flat, planar surface, which is perpendicular to the axis of relative rotation of the two members. It is desirable for this surface to be a smooth, machined surface, which may be polished. The conformable sealing member should be made of a low-friction material which is softer than the surface on which it seals.

The two relatively-moving components of this valve may be positioned relative to each other through a rotary bearing. electromagnetic means may be used to provide the motion.

In an additional aspect, this invention provides a valve for controlling flow of a fluid from a supply to a volume wherein pressure is to be controlled, and for exhausting fluid from the volume to an exhaust port. A housing (which may have a plurality of components, such as a main body and a cover) has three ports: a supply port, a delivery port, and an exhaust port. A rotor is placed inside the housing, and means are provided for controlling its angular position. In a first position, a flowpath is provided through the rotor to join the supply port and the delivery port. In a second angular position, a flowpath is provided through the rotor to join the delivery port to the exhaust port. The rotor may also be positioned in a third angular position, which is a lap position in which no flowpaths are provided between ports.

A seal is provided which prevents loss of fluid from the supply port, a seal is provided which prevents loss of fluid from the delivery port, and a seal is provided which prevents loss of fluid to the exhaust port.

The seal which prevents loss of fluid from the supply port can be located on either the rotor or the housing, and it may pass completely around the axis of the rotor.

The seal which prevents loss of fluid from the supply port may consist of an annular recess in either the rotor or the housing, and a conformable sealing member in the recess. A spring pushes the conformable sealing member toward the sealing surface, and an O-ring on the outside of the conformable sealing member prevents loss of fluid through the recess outside of the conformable sealing member.

In like manner, the seal which prevents loss of fluid from the delivery port may consist of an annular recess passing around the delivery port. A conformable sealing member is placed in the recess. A spring pushes the conformable sealing member toward the sealing surface on the rotor, and an O-ring on the outside of the conformable sealing member prevents loss of fluid through the recess outside of the conformable sealing member.

In like manner, the seal which prevents loss of fluid to the exhaust port may consist of an annular recess passing around the exhaust port. A conformable sealing member is placed in the recess. A spring pushes the conformable sealing member toward the sealing surface on the rotor, and an O-ring on the outside of the conformable sealing member prevents loss of fluid through the recess outside of the conformable sealing member.

The sealing surface on the rotor may be a planar surface perpendicular to the axis of the rotor.

The positioning of the rotor relative to the housing may be accomplished by a rotary bearing means, and rotation of the rotor may be accomplished by a rotary electromagnetic means.

To define the angle of the exhaust position, a stop to limit the rotary motion may be provided. To define a range of angles for the lap position, a torsion spring may be used, and the current supplied to the rotary electromagnetic means may be adjusted to balance the spring torque at the desired lap position.

In a further aspect, this invention provides a valve for controlling flow of a fluid between a supply and a volume in which pressure is to be controlled, and between the volume and an exhaust port. In a first position, the valve provides connection between the supply and the volume where pressure is to be controlled. In a second position, the valve provides connection between the volume where pressure is to be controlled an exhaust. In a third position, which is a lap position, no flowpaths are established through the valve.

The valve has a housing (which may have a plurality of components, such as a main body and a cover). A rotor is placed inside the housing. Inside the housing there are two axisymmetric surfaces, at two different axial positions. These may be planar surfaces perpendicular to the axis of the rotor. Seals are provided on the rotor pressing against these axisymmetric surfaces to prevent flow of fluid past either of the two axial positions. Fluid from the supply is introduced into the inside of the housing at an axial position between that of the two seals. A gap is provided between the housing and the rotor in the space between the two seals, so that fluid can flow around the rotor inside the housing. From this gap, the fluid flows into an internal space in the rotor.

The rotor has an axisymmetric surface (which may be a planar surface perpendicular to its axis). A port is provided on this surface which communicates with the internal space inside the rotor. Two additional ports are provided in this surface, and these are connected to each other through a second passageway inside the rotor.

The housing has an additional axisymmetric surface (which may be a planar surface perpendicular to the axis of the rotor). Two ports are provided on this surface, one is a delivery port connected to the volume in which pressure is to be controlled, and the other is for exhaust.

Annular seals are provided surrounding each of the three ports on the axisymmetric surface of the rotor, and these seal against the axisymmetric surface of the housing. An annular seal is also provided surrounding the delivery port on the housing, and this seals against the axisymmetric surface on the rotor.

Means are provided for positioning the rotor in three different positions. In one position, fluid from the first internal space in the rotor, which is the fluid being supplied, flows into the delivery port on the housing. In a second position, the supply space in the rotor is sealed off, and the delivery port is connected through the second passageway in the rotor to the exhaust port. In a third position, which is a lap position, each of the ports on these surfaces is sealed off, so that no flow to or from the delivery port occurs.

Equalization of pressures around the circumference of the rotor may be provided by ports which pass transversely across the rotor.

While the presently preferred embodiment, and various additional alternative embodiments for carrying out the instant invention has been set forth in detail in accordance with the Patent Act, those persons skilled in the electric valve art to which this invention pertains will recognize various alternative ways of practicing the invention without departing from the spirit and scope of the appended claims.

Accordingly, to promote the progress of science and useful arts, I secure for myself by Letters Patent for a limited time exclusive rights to all subject matter embraced by the following claims.

We claim:

1. A self wear compensating valve for controlling flow of a fluid from a source to a destination, said valve comprising:

(a) a first member having at least one first internal space formed therein;

(b) a first surface on said first member, said first surface having at least one first port communicating with said at least one first internal space formed in said first member;

(c) a second member having at least one second internal space formed therein;

(d) a second surface on said second member, said second surface having at least one second port communicating with said at least one second internal space formed in said second member;

said first surface on said first member and said second surface on said second member being disposed in close proximity and contact, said first surface and said second surface being formed so as to permit a relative shearing motion said first and second surfaces, while maintaining said first surface and said second surface in close proximity and contact;

(e) means for providing said relative shearing motion between said first member and said second member;

(f) means for connecting said first internal space in said first member to the source for said fluid;

(g) means for connecting said second internal space in said second member to the destination for such fluid;

(h) an annular recess formed in said first member, said annular recess surrounding said first port, said annular recess having an outer diameter and an inner diameter;

(i) annular sealing means disposed in said annular recess, said annular sealing means having an outer diameter and an inner diameter;

(j) resilient means disposed in said annular recess, said resilient means biasing said annular sealing means to press against said second surface on said second member;

(k) an O-ring disposed between said outer diameter of said annular sealing means and said outer diameter of said annular recess, said O-ring serving to prevent fluid flow between said outer diameter of said annular sealing means and said outer diameter of said annular recess;

said second port having a dimension transverse to a direction of said relative shearing motion, said dimension being smaller than said outer diameter of said annular sealing means;

said means for providing said relative shearing motion between said first member and said second member providing at least a first position wherein said first port communicates with said second port, and a second position wherein said first port is closed off by said second surface on said second member, said annular sealing means preventing fluid flow between said first surface and said second surface;

said first port and said second port being further characterized in that at least one of said first port and said second port has a greater dimension in a direction parallel to a direction of said relative shearing motion than in a direction perpendicular to said direction of said relative shearing motion;

a pressure of such fluid cooperating with said resilient means to bias said annular sealing means towards said second surface with a force which increases with increasing value of the pressure.

2. A self wear compensating valve according to claim 1 wherein said second surface of said second member is formed as at least a portion of a surface of revolution.

3. A self wear compensating valve according to claim 2 wherein said second surface of said second member is formed as a planar surface.

4. A self wear compensating valve according to claim 2 wherein said second surface of said second member is smooth.

5. A self wear compensating valve according to claim 2 wherein said means for providing said shearing motion between said first member and said second member includes at least one rotary bearing means, said rotary bearing means connecting said first member to said second member.

6. A self wear compensating valve according to claim 2 wherein said means for providing said shearing motion between said first member and said second member is a rotary electromagnetic means.

7. A self wear compensating valve according to claim 1 wherein said annular sealing means is made of a low-friction material softer than at least a portion of said second surface.

8. A self wear compensating valve according to claim 1 wherein said resilient means is one of a coil spring and a spring washer.

9. A valve for controlling flow of a fluid from a supply to a volume wherein pressure is to be controlled, said valve comprising:

(a) a housing means having a supply port, a delivery port, and an exhaust port;

(b) a rotor disposed within said housing means, said rotor having an axis;

(c) means for positioning said rotor relative to said housing means in a first angular position wherein a first flowpath is provided through said rotor between said supply port and said delivery port;

(d) means for positioning said rotor relative to said housing in a second angular position wherein a second flowpath is provided through said rotor between said delivery port and said exhaust port;

(e) means for positioning said rotor in a third angular position, which is a lap position, wherein said first flowpath between said supply port and said delivery port is closed, and said second flowpath between said delivery port and said exhaust port is closed;

(f) first sealing means disposed between said rotor and said housing to prevent loss of fluid from said supply port;

(g) second sealing means disposed between said rotor and said housing to prevent loss of fluid from said delivery port;

(h) third sealing means disposed between said rotor and said housing to prevent loss of fluid through said exhaust port;

said first flowpath and said second flowpath being further characterized in that at least one of said first flowpath and said second flowpath has at least a portion thereof at an interface between said housing and said rotor, said portion having a transverse dimension parallel to a direction of rotation of said rotor greater than a transverse dimension perpendicular to a direction of rotation of said rotor.

10. A valve according to claim 9 wherein said first sealing means includes:

(I) a first surface formed as at least a portion of a surface axisymmetrical about said axis of said rotor, said surface disposed on a first one of said rotor and said housing;

(II) a conformable sealing member disposed on a second one of said rotor and said housing, said conformable sealing member pressing against said first surface.

11. A valve according to claim 10 wherein said conformable sealing member passes around said axis of said rotor.

12. A valve according to claim 11 wherein a recess having an outer diameter and an inner diameter is provided in said second one of said rotor and said housing, said conformable sealing member being disposed within said recess, an o-ring being placed between said conformable sealing member and said outer diameter of said recess, and resilient means disposed within said recess to bias said conformable sealing member against said first surface.

13. A valve according to claim 9 wherein said second sealing means includes:

(I) an annular recess formed in said housing means, surrounding said delivery port, said annular recess having an outer diameter and an inner diameter;

(II) an annular, conformable sealing member disposed in said annular recess, said annular, conformable sealing member having an outer diameter and an inner diameter;

(III) resilient means disposed in said annular recess, said resilient means biasing said annular, conformable sealing member to press against said rotor;

(IV) an O-ring disposed between said outer diameter of said annular, conformable sealing member and said inside diameter of said annular recess, said O-ring serving to prevent fluid flow between said outer diameter of said annular, conformable sealing member and said outer diameter of said annular recess.

14. A valve according to claim 9 wherein said third sealing means includes:

(I) an annular recess formed in said housing means, surrounding said exhaust port, said annular recess having an outer diameter and an inner diameter;

(II) an annular, conformable sealing member disposed in said annular recess, said annular, conformable sealing member having an outer diameter and an inner diameter;

(III) resilient means disposed in said annular recess, said resilient means biasing said annular, conformable sealing member to press against said rotor;

(IV) an O-ring disposed between said outer diameter of said annular, conformable sealing member and said outside diameter of said annular recess, said O-ring serving to prevent fluid flow between said outer diameter of said annular, conformable sealing member and said outer diameter of said annular recess.

15. A valve according to claim 10 wherein said first surface is a planar surface pendicular to said axis of said rotor.

16. A valve according to claim 9 where said means for positioning said rotor relative to said housing includes at least one rotary bearing means.

17. A valve according to claim 9 wherein said means for positioning said rotor relative to said housing is a rotary electromagnetic means.

18. A valve according to claim 9 wherein said means for positioning said rotor relative to said housing includes a torsion spring and a stop to limit rotary motion.

19. A valve for controlling flow of a fluid from a supply having a first pressure, said valve having at least three positions, a first position for passing fluid from a supply to a volume wherein a second pressure is to be controlled, a second position for maintaining an amount of such fluid in such volume substantially constant, and a third position for exhausting said fluid from the volume, said valve comprising:

(a) a housing means having an axis, said housing means having an inner surface having at least a first axisymmetric surface portion at a first axial position in reference to said axis, formed as a surface of revolution in reference to said axis, a second axisymmetric surface portion at a second axial position in reference to said axis, formed as a surface of revolution in reference to said axis, said housing means having an outer surface;

(b) a first housing supply port formed in said outer surface of said housing means for receiving such fluid from such supply;

(c) a second housing supply port formed in said inner surface of said housing means at an axial position disposed between said first axial position and said second axial position, said second housing supply port communicating with said first housing supply port;

(d) a rotor positioned within said housing means;

(e) a gap between said rotor and said housing, at an axial position between said first axial position and said second axial position;

(f) first sealing means disposed on said rotor, said first sealing means contacting said housing means on said first axisymmetric surface portion;

(g) second sealing means disposed on said rotor, said second sealing means contacting said housing means on said second axisymmetric surface portion;

said first sealing means and said second sealing means serving to confine such fluid from such supply to said gap in a range of axial positions between said first axial position and said second axial position;

(h) a rotor supply port disposed on said rotor at an axial position disposed between said first axial position and said second axial position, (i) a first rotor internal passageway for such fluid from such supply, said first rotor internal passageway communicating with said rotor supply port;

(j) a third axisymmetric surface portion on said housing means, formed as a surface of revolution in reference to said axis;

(k) a fourth axisymmetric surface portion on said rotor, formed as a surface of revolution in reference to said axis, said fourth axisymmetric surface portion being disposed adjacent to said third axisymmetric surface portion on said housing means;

(l) a housing delivery port disposed within a first annular sealing means adjacent said fourth axisymmetric surface portion on said rotor; said first annular sealing means providing a seal between said housing delivery port and said fourth axisymmetrical surface portion on said rotor, said housing delivery port communicating with such volume wherein such second pressure is to be controlled;

(m) a housing exhaust port disposed on said third axisymmetric surface portion on said housing means, said housing exhaust port communicating with one of an ambient atmosphere and a vessel having a third fluid pressure lower than such first pressure of such supply;

(n) a rotor delivery port disposed within a second annular sealing means, said second annular sealing means providing a seal between said rotor delivery port and said third axisymmetric surface portion on said housing means, said rotor delivery port communicating with said first rotor internal passageway;

(o) a first rotor exhaust port disposed within a third annular sealing means adjacent said third axisymmetric surface portion on said housing means, said third annular sealing means providing a seal between said first rotor exhaust port and said third axisymmetric surface portion on said housing means;

(p) a second rotor exhaust port disposed within a fourth annular sealing means adjacent said third axisymmetric surface portion on said housing means, said third annular sealing means providing a seal between said second rotor exhaust port and said third axisymmetric surface portion on said housing means;

(q) a second rotor internal passageway, formed within said rotor, joining said second rotor exhaust port to said first rotor exhaust port;

(r) means for positioning said rotor in at least three angular positions: a first angular position wherein said rotor delivery port is positioned adjacent said housing delivery port whereby a flow path is provided between said supply and said volume wherein said second pressure is to be controlled; a second angular position which is a lap position for maintaining a constant amount of fluid in said volume wherein said second pressure is to be controlled, wherein said rotor delivery port is positioned adjacent said third axisymmetric surface portion and sealed off by contact between said second annular sealing means and said third axisymmetric surface portion, and said housing delivery port is positioned adjacent said fourth axisymmetric surface portion on said rotor, and sealed off by contact between said first annular sealing means and said fourth axisymmetric surface portion; and a third angular position wherein said housing delivery port is adjacent said first rotor exhaust port, and said second rotor exhaust port is adjacent said housing exhaust port whereby fluid is exhausted from said volume wherein said second pressure is to be controlled;

said rotor delivery port, said first rotor exhaust port, said second rotor exhaust port, said housing delivery port, and said housing exhaust port being further characterized in that at least one thereof has a dimension parallel to a direction of rotation of said rotor greater than a dimension perpendicular to a direction of rotation of said rotor.

20. A valve according to claim 19 wherein said valve includes at least one pressure equalization passageway at an angular position different from that of said rotor supply port, said pressure equalization passageway communicating with said rotor supply port and serving to equalize pressures between said rotor and said housing in said gap between said rotor and said housing.

* * * * *